(12) United States Patent
Juni

(10) Patent No.: US 7,138,638 B2
(45) Date of Patent: Nov. 21, 2006

(54) EDGE EFFECTS TREATMENT FOR CRYSTALS

(76) Inventor: Jack E. Juni, 25595 York St., Royal Oak, MI (US) 48067

( * ) Notice: Subject to any disclaimer, the term of this patent is extended or adjusted under 35 U.S.C. 154(b) by 0 days.

(21) Appl. No.: 10/993,012

(22) Filed: Nov. 19, 2004

(65) Prior Publication Data

US 2005/0167605 A1 Aug. 4, 2005

Related U.S. Application Data

(60) Provisional application No. 60/523,765, filed on Nov. 20, 2003.

(51) Int. Cl.
G01T 1/20 (2006.01)
(52) U.S. Cl. .................................. 250/370.11
(58) Field of Classification Search ........... 250/370.11, 250/363.03
See application file for complete search history.

(56) References Cited

U.S. PATENT DOCUMENTS

| | | | |
|---|---|---|---|
| 4,284,891 A | 8/1981 | Pergrale et al. | |
| 4,532,425 A | 7/1985 | Abileah et al. | |
| 5,442,181 A | 8/1995 | Yamakawa et al. | |
| 5,550,378 A | 8/1996 | Skillicorn et al. | |
| 5,763,887 A | 6/1998 | Murphy | |
| 6,362,479 B1 * | 3/2002 | Andreaco et al. | 250/366 |
| 6,369,390 B1 | 4/2002 | Genna | |
| 6,541,774 B1 | 4/2003 | DeJule et al. | |
| 6,555,895 B1 | 4/2003 | Hshieh et al. | |
| 6,563,121 B1 | 5/2003 | Schreiner et al. | |
| 6,750,456 B1 | 6/2004 | Majewski et al. | |
| 2003/0034455 A1 | 2/2003 | Schreiner et al. | |
| 2004/0131158 A1 | 7/2004 | Hoheisel et al. | |
| 2004/0232342 A1 * | 11/2004 | Aykac et al. | 250/367 |

FOREIGN PATENT DOCUMENTS

| | | |
|---|---|---|
| EP | 0 350 758 A1 | 1/1990 |
| JP | 357104873 A | 6/1982 |
| JP | 358216974 A | 12/1983 |
| JP | 363061176 A | 3/1988 |
| JP | 363282681 A | 11/1988 |
| JP | 403239785 A | 10/1991 |
| JP | 405019060 A | 1/1993 |
| JP | 408233942 A | 9/1996 |
| JP | 408271637 A | 10/1996 |
| JP | 409292469 A | 11/1997 |
| JP | 2000-098040 A | 4/2000 |

* cited by examiner

Primary Examiner—Renee Luebke
Assistant Examiner—Mary Zettl
(74) Attorney, Agent, or Firm—Gifford, Krass, Groh, Sprinkle, Anderson & Citkowski, PC

(57) ABSTRACT

A scintillator, for use in a radiation imaging device, has a light-emitting face, a radiation receiving face, and a perimeter extending between the light-emitting face and the radiation receiving face, the perimeter including an edge, the edge having an edge thickness. The scintillator emits scintillation light from the light emitting face in response to radiation incident on the radiation receiving face. The scintillator has one or more light guides formed within a peripheral region of the scintillator proximate to the edge. The light guides can improve the positional accuracy of a radiation imaging device including the scintillator.

103 Claims, 8 Drawing Sheets

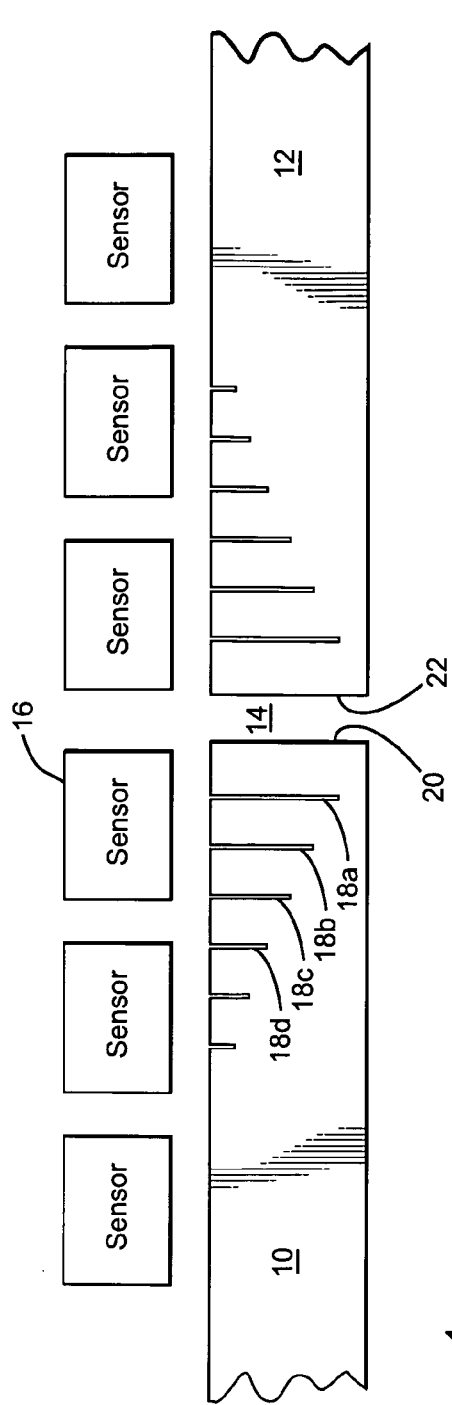
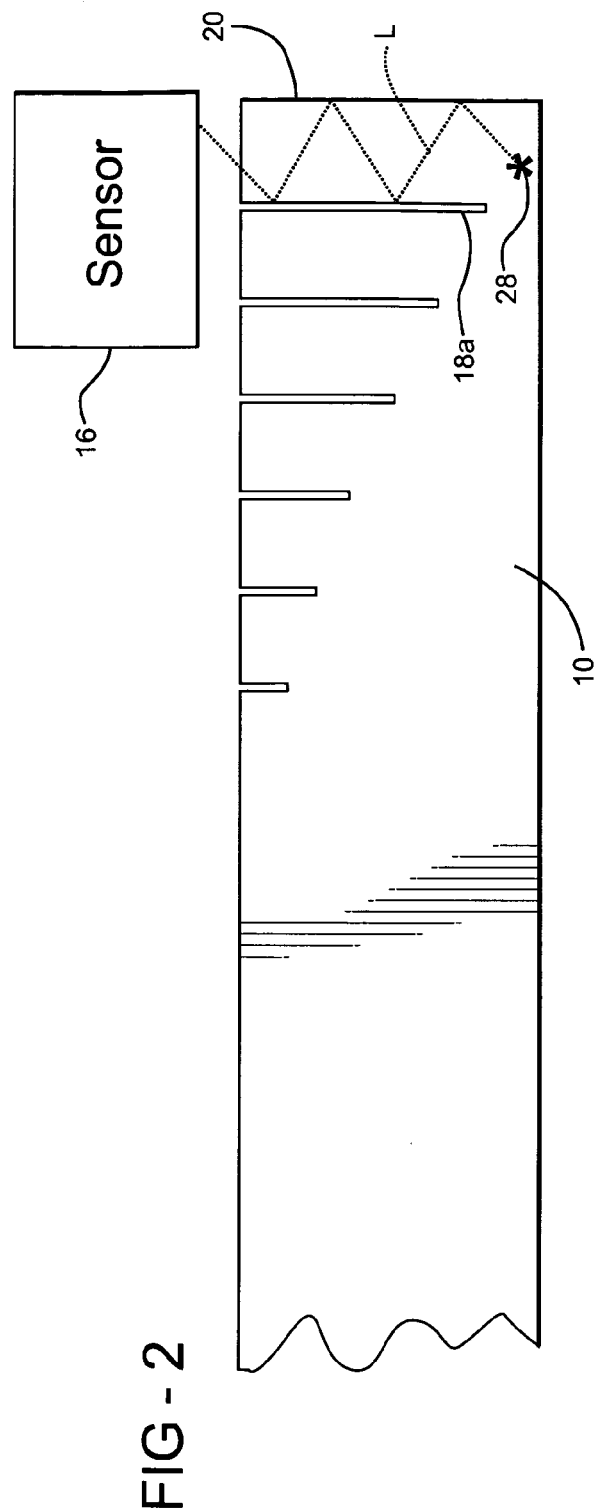
FIG - 1
FIG - 2

EDGE EFFECTS TREATMENT FOR CRYSTALS

REFERENCE TO RELATED APPLICATION

This application claims priority of U.S. Provisional Patent Application Ser. No. 60/523,765 filed Nov. 20, 2003, the entire contents of which are incorporated herein by reference.

FIELD OF THE INVENTION

The invention relates to improved apparatus and methods relating to reduction or elimination of edge effects in optical elements, for example, scintillators.

BACKGROUND OF THE INVENTION

A scintillation material, or scintillator, produces light in response to incident radiation, typically ionizing radiation such as gamma rays or x-rays. Such a material can be a crystal such as thallium-doped sodium iodide, NaI(Tl), or a non-crystalline material such as a plastic.

Radiation detectors using scintillators include gamma cameras, x-ray detectors, and other radiation imaging or sensing devices. The scintillator generally has a radiation receiving face on which radiation such as gamma rays are incident. The scintillator has a light output face from which light emerges in response to incident radiation, and also an outside edge. For example, a disk-shaped scintillator would have a cylindrical edge surface. An optical window, such as glass, is typically bonded to the light output face of the scintillator. An array of light sensors, such as photomultiplier tubes, receive scintillation light emitted from the light output face of the scintillator, and transmitted through the window to the detectors. A plastic "light pipe" is sometimes interposed between the window and the light sensors.

The light is generated within the scintillator as pulses (also termed scintillation events). The positions of light pulses generated within the scintillator are used in imaging applications, such as SPECT (single photon emission tomography) and PET (positron emission tomography) imaging. Such uses may be generally referred to as scintillation imaging.

A problem in scintillation imaging is that reflections from the edge of the scintillator will reduce the measured positional accuracy of imaging data, particularly for scintillation events occurring close to the edge of the scintillator. Light from scintillation events occurring near an edge will be reflected from that edge, causing a serious reduction in ability to accurately determine the position of such events. In practice, a dead zone may exist around a peripheral region, proximate to the edge of the scintillator or window, from which meaningful positional data cannot be collected. This dead zone or "edge effect" reduces the effective usable portion of the scintillator. In addition, the presence of this unusable region at the periphery of the detector prevents the detector from being positioned optimally in many medical applications, for example breast and brain scintigraphy. The increase in detector bulk caused by the wasted portion of the detector may also make it difficult to position the detector sufficiently close to the patient in applications such as heart scintigraphy and many forms of SPECT.

In some detector designs, it is desirable to have more than one scintillator element in close proximity to another. In this situation, the junctions between elements tend to act as reflecting edges causing an unusable dead zone of edge effect on each side of the junctions.

This problem is well recognized in the field. For example, a previous attempt to solve this problem is described in U.S. patent application Publication 2003/0034455 to Schreiner et al., which suggests segmenting the scintillator into a number of triangular segments. However, such segmentation adds to the cost of a device, is difficult to fabricate and may cause problems if the scintillator absorbs moisture from the air. For example, it is well known that sodium iodide should be protected from atmospheric moisture.

Another attempted solution is described by U.S. Pat. No. 4,284,891 to Pergale et al., which suggests providing a diffused light reflector around the periphery of the optical window. However, it can be difficult to provide a true diffused reflector, as reflection properties of many materials and the crystal edge will change with time and environmental conditions. In addition, such diffused edge treatments have been found in practice to provide an unsatisfactory degree of improvement to the problem.

Hence, there is a need for improved scintillators and radiation detectors which reduce or eliminate the undesirable effects of edge reflection.

SUMMARY OF THE INVENTION

Methods and apparatus are provided to reduce edge effects, such as loss of positional accuracy due to edge reflection, in optical elements such as scintillators. For example, one or more light guides can be provided in a peripheral region of a scintillator or optical window close to an edge.

A radiation detector according to an example of the present invention comprises a scintillator having a light-emitting face, a radiation receiving face, and a perimeter extending between the light-emitting face and the radiation receiving face, the perimeter including an edge. The scintillator emits scintillation light from the light emitting face in response to radiation incident on the radiation receiving face. One or more light guides are formed within a peripheral region proximate to the edge, a light guide redirecting a portion of scintillation light before it emerges from the light emitting face. The radiation detector may further comprise a number of light sensors receiving scintillation light from the scintillator.

Light guides provided within the peripheral region can improve the positional accuracy of the radiation detector. There may be a plurality of spaced apart light guides formed only within the peripheral region. The light guides may include grooves having a groove depth which decreases as the distance of the groove from the edge increases.

The light emitting face of the scintillator may have a non-peripheral region, such as a central region, in which there are no light guides. Depending on the application, the non-peripheral region may be larger, sometimes substantially larger, than the peripheral region.

The peripheral region is a region within a certain distance of the edge. The distance may be some multiple of an edge thickness, such as less than ten times, for example within eight times the edge thickness of the edge. The distance may also be the approximate diameter of a light sensor.

A light guide may comprise a groove formed in the light emitting face and/or the radiation receiving face of a scintillator. In other examples, light guides may be provided in a window between a scintillator and a detector or detectors. A light guide may comprise a groove, reflecting film, an interface or other boundary between two regions of different refractive indices, or other structure providing an internal reflection or refraction of light within the scintillator. The light guide can be substantially parallel to the edge.

Another example of an improved radiation detector comprises a scintillator, an array of sensors in optical communication with a light emitting face of the scintillator, a window between the scintillator and the array of light sensors, the scintillator and/or the window having one or more grooves formed in a face thereof. The grooves may be formed only within a peripheral region of the scintillator and/or window.

In examples discussed below, the term "crystal" is often used for convenience to refer to a scintillation material. However, any example discussed here equally applies to non-crystalline scintillators. The methods and apparatus described can also be adapted for use in other optical elements, as will be clear to those skilled in the optical arts.

BRIEF DESCRIPTION OF THE DRAWINGS

FIG. 1 shows a side view of a pair of crystals, each having a number of grooves cut in respective peripheral regions proximate to crystal edges;

FIG. 2 shows a side view of a crystal, showing grooves cut in the light output face of the crystal within a peripheral region proximate to the crystal edge;

DETAILED DESCRIPTION OF THE INVENTION

Figures 3, 4A:
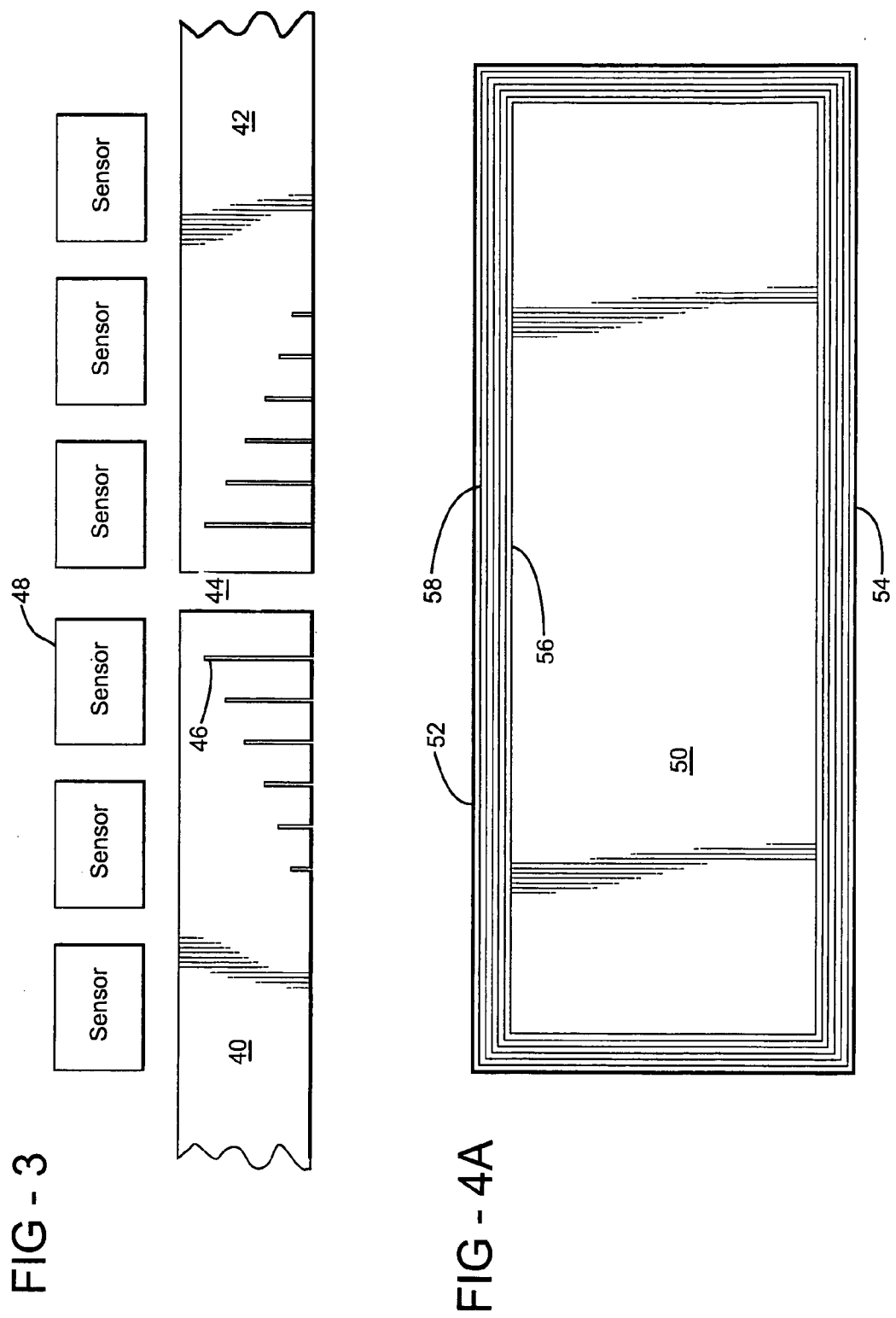
FIG. 3 is a side view of a pair of crystals, each having grooves cut in a peripheral region of the radiation receiving face.
FIGS. 4A and 4B show top views of a crystal.

In examples discussed below, the term "crystal" is used for convenience to refer to a scintillation material. However, examples discussed here apply equally to non-crystalline scintillators. Also, in examples discussed below, light guides are provided by grooves cut into one or more surface of the crystal (or associated window). As discussed in more detail below, other forms of light guide can also be used, for example, reflective films.

FIG. 1 shows a portion of a first crystal 10, a portion of a second crystal 12, a crystal gap 14 between the two crystals, a plurality of sensors such as sensor 16, a plurality of grooves in the light emitting face of each crystal, such as grooves 18a–18d, a first crystal edge 20, and a second crystal edge 22.

As drawn, the lower surface of the crystal 10 is the radiation receiving face, and the upper surface of the crystal is the light emitting face. This convention will be followed (for convenience only) through the various figure descriptions.

The light emitting face and radiation receiving face can be generally parallel and coextensive, and interconnected by a perimeter, the perimeter defining an edge. The crystal can be in the form of a cuboid, having a length, width, and thickness, the thickness being the edge thickness. The thickness may be substantially less than the length and/or width of the crystal.

Sensors may be in different positions from those shown. A sensor may, for example, span the gap between two crystals. Sensors may be provided in a linear or two-dimensional array, or other configuration. Scanning imaging methods may also be used.

FIG. 2 shows another view of crystal 10. The star symbol at 28 represents a pulse of scintillation light (a scintillation event) produced by radiation interacting with the crystal. For convenience, the term "scintillation light" will often be abbreviated to "light". The zigzag arrow labeled L represents a possible path of light out of the crystal. For convenience, not all grooves are shown.

Light will tend to propagate in all directions within the crystal 10 from the scintillation event (the production of a pulse of light). However, the arrows show the groove 18a and crystal edge 20 operating cooperatively to provide a light guiding effect, whereby light is reflected from the crystal edge and from the inner surface of the groove so as to take a path remaining proximate to the edge, and to emerge from the light emitting face within a portion of the light emitting face between the groove and the crystal edge. Hence, the groove 18a and the crystal edge 20 provide partial optical confinement, or a waveguide effect.

FIG. 3 shows a first crystal 40, a second crystal 42, a separation gap 44, grooves such as groove 46 in the radiation receiving face of each crystal, and a plurality of sensors such as sensor 48. The sensors are in optical communication with the upper face, or light emitting face, of each crystal. This figure illustrates that grooves may be provided in the radiation receiving face of the crystal, as well as or instead of grooves in the light emitting face.

FIG. 4A shows a top view of a crystal, showing a rectangular light emitting face, having a surface (such as the light emitting face) 50, and a plurality of grooves such as 56 and 58 around the periphery of the crystal, proximate to the edge. The edge is shown as rectangular, including sides 52 and 54. The grooves may have equal depth, or in other examples the groove depth is greatest for the groove closest to the edge (groove 58), and shallowest for the groove furthest for the edge (groove 56). The depth of grooves can be correlated with the distance from the edge, for example inversely proportional to the distance, as discussed in more detail below.

The crystal may also have a rectangular cross section, so as to have a cuboid form. The orthogonal edge regions of the crystal, as illustrated in FIG. 4A, may be designated as sides or edges, as preferred. Analogous groove patterns may be formed in one or more faces of the crystal and/or window.

Figure 4B:
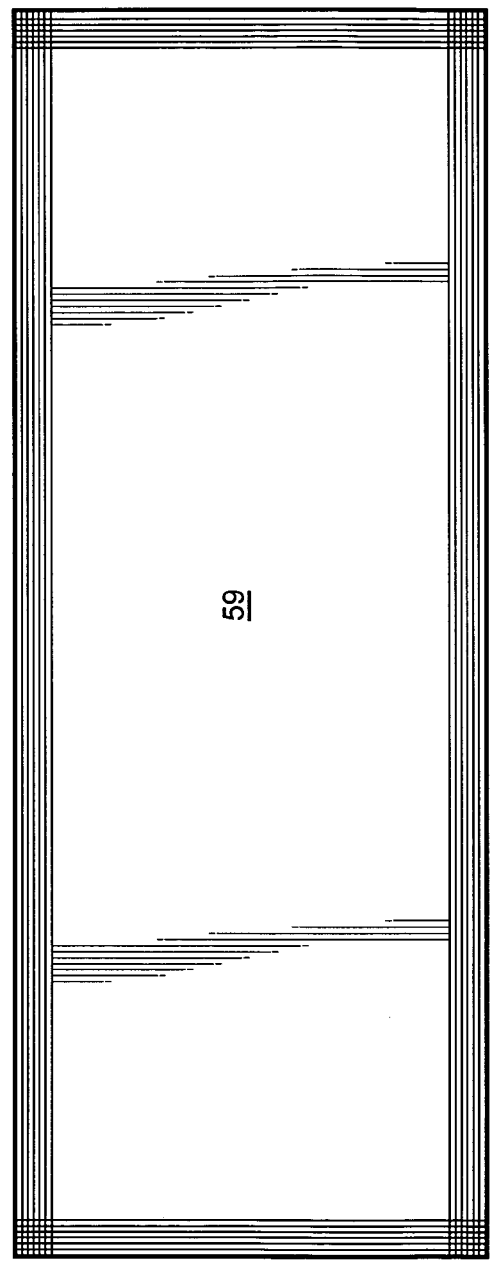

FIG. 4B shows a top view of another example, in which grooves formed in the surface 59 form a cross-hatched pattern in the corners. Other details may be the same as discussed above in relation to FIG. 4A.

Figure 5:
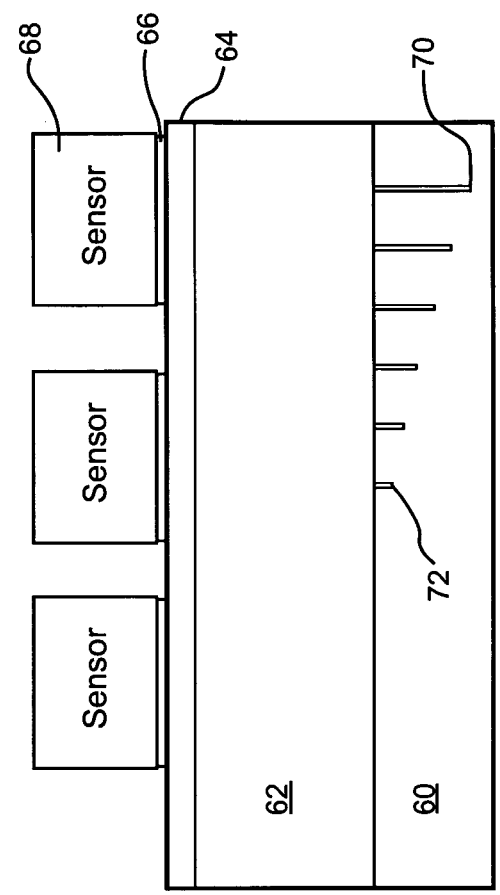
FIG. 5 shows a side view of a crystal, having both a window and an optical transmission element, the latter having grooves cut in the lower face.

FIG. 5 shows a side view of a radiation detector comprising a radiation-side optical transmission element 60, a crystal 62, a window 64, an optical matching medium 66, a plurality of sensors such as sensor 68, and a plurality of grooves such as 70 and 72. In this example the grooves are formed in the upper side of the optical transmission element 60, proximate to the radiation receiving face of the crystal 62.

In another example which may appear similar to that illustrated in FIG. 5, the radiation detector comprises a crystal and lower and upper optical transmission elements or window layers supported by the light emitting face of the crystal. The grooves can be formed in the light emitting face of the crystal.

Figure 6:
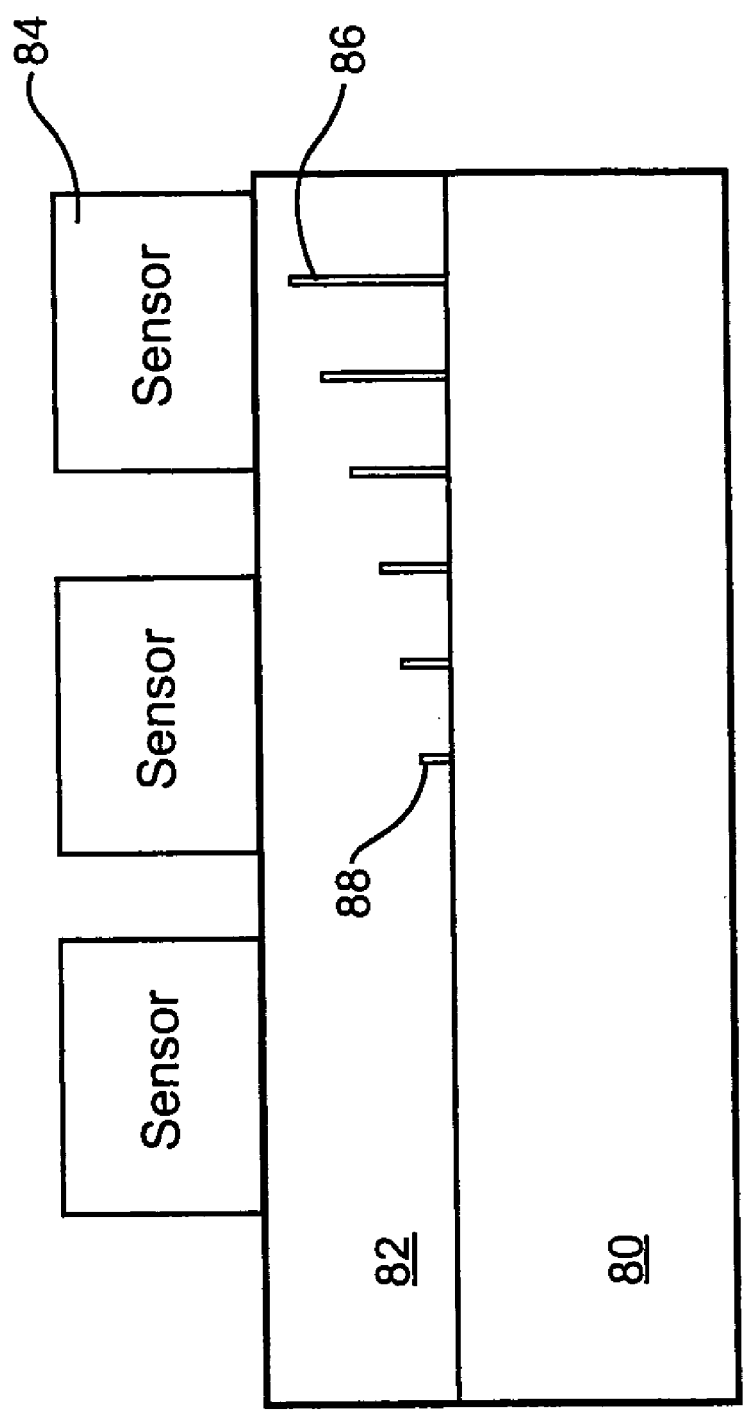
FIG. 6 is a side view of a radiation detector, including a crystal and a window having grooves cut in the lower face of the window.

FIG. 6 represents a side view of a radiation detector, comprising a crystal 80, a window 82, a plurality of sensors such as sensor 84, and a plurality of grooves such as grooves 86 and 88. In this example, the grooves are formed in the lower side of the window, the side of the window proximate to the light emitting face of the crystal. It should be recalled that the crystal and the window, both typically being transparent, may be considered as a single optical element., i.e. together they form a continuous medium for transmission of light. Thus, placement of groves in the window provides a reduction in edge effect in the same manner, although to a lesser extent, as do grooves in the crystal itself. It should also be appreciated that light reflections occur from both the edge of the crystal and from the edge of the window. Reflections from the edge of the window may further degrade spatial accuracy beyond the effects of edge reflections in the crystal itself. An existing radiation detector may be improved by the simple process of replacing the existing window with a window having a plurality of grooves within the side of the window proximate to the crystal. In another example, the grooves may be formed in the upper face of the window, the face most distant from the crystal.

Figure 7:
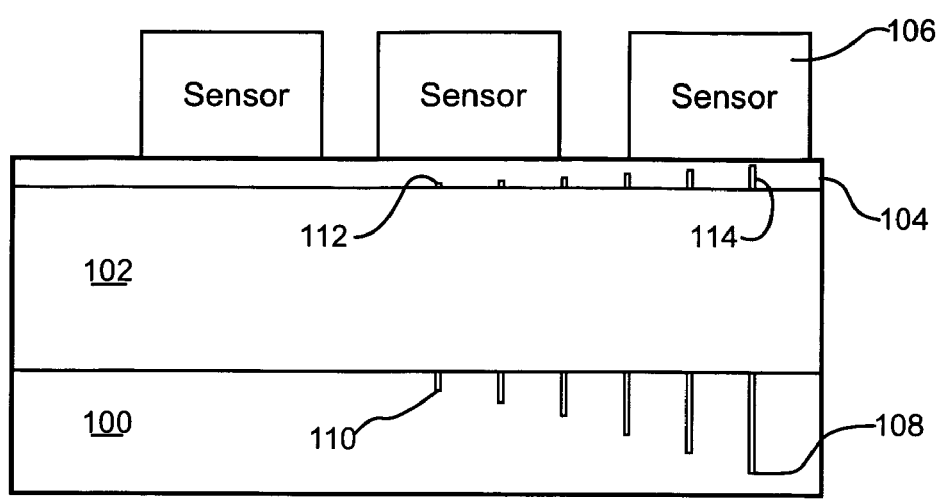
FIG. 7 is a side view of a radiation detector, having both a window and an optical transmission element, each having grooves.

FIG. 7 shows a radiation detector comprising a radiation side window or optical transmission element 100, a crystal 102, a window 104, a sensor 106, grooves such as 108 and 110 in the radiation-side window proximate to the radiation receiving face of the crystal, and grooves such as 112 and 114 in the lower surface of the window proximate to the light emitting face of the crystal.

In another example, which may appear similar to that illustrated in FIG. 7, a radiation detector comprises a crystal, a lower window, and an upper window. In this example, grooves are provided within the crystal and within one or two window layers transmitting light from the crystal to the sensor.

Figure 8:
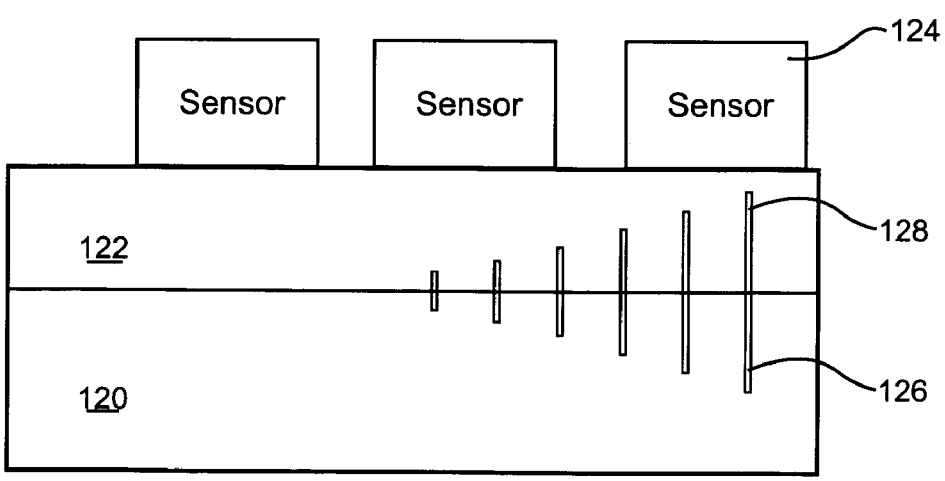
FIG. 8 is a side view of a radiation detector, having grooves in both the crystal and the window.

FIG. 8 illustrates a radiation detector comprising a crystal 120, a window 122, and a sensor 124, with grooves such as 128 provided in the lower surface of the window. Grooves such as 126 are provided in the upper surface of the crystal. In this example the grooves in the crystal and the grooves in the window are substantially in register.

Figure 9:
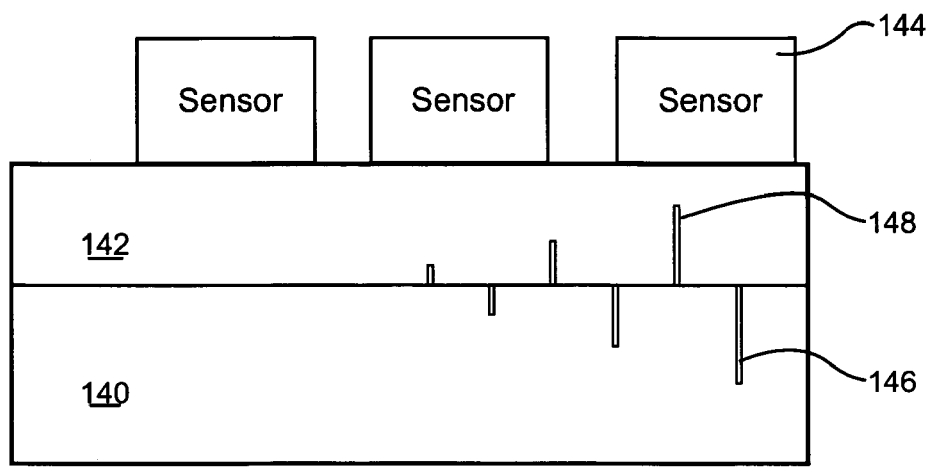
FIG. 9 is a side view of a radiation detector having grooves in the crystal and the window, the grooves not being in register.

FIG. 9 shows a radiation detector comprising a crystal 140, a window 142, a sensor 144, grooves such as 146 in the upper surface of the crystal, and grooves such as 148 in the lower surface of the window. In this example the grooves in the crystal and grooves in the window are substantially out of register.

Figure 10:
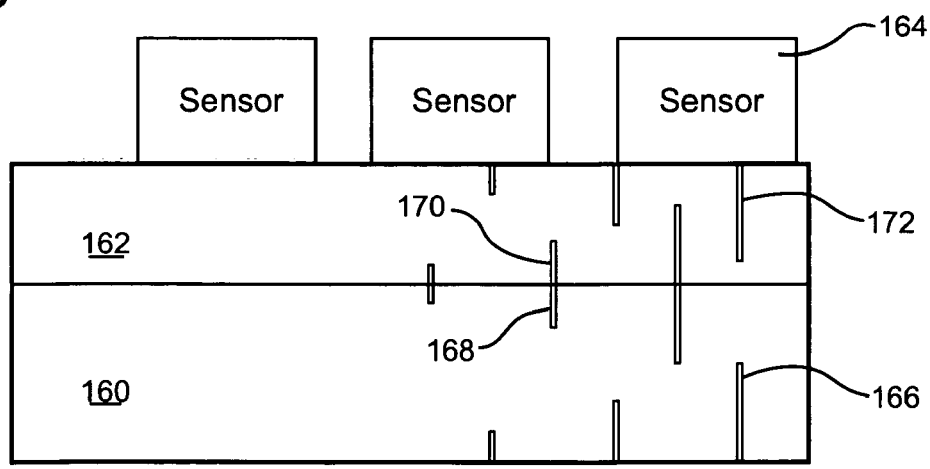
FIG. 10 shows a radiation detector, having grooves in the upper and lower faces of both the crystal and window.

FIG. 10 shows a radiation detector comprising a crystal 160, a window 162, a sensor 164, grooves such as 166 in the lower face of the crystal, grooves such as 168 in the upper surface of the crystal, grooves such as 170 in the lower surface of the window, and grooves such as 172 in the upper surface of the window.

Figure 11:
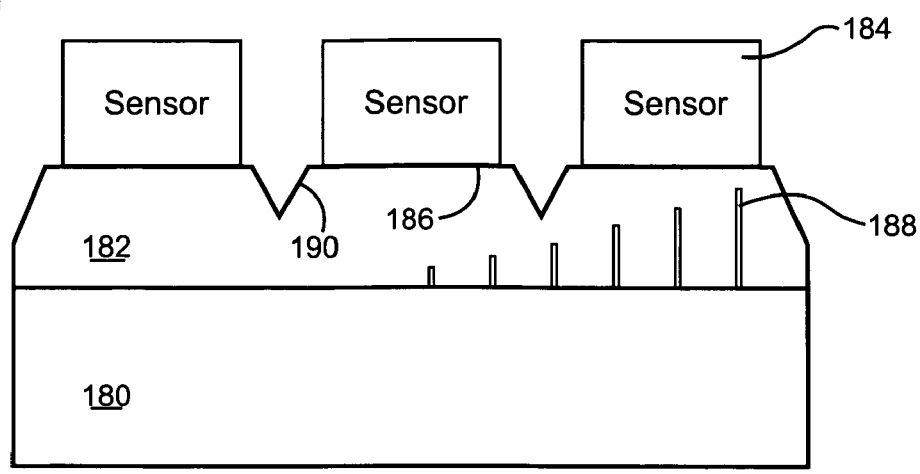
FIG. 11 shows a radiation detector, the window/light pipe having an upper surface shaped so as to direct light to a plurality of sensors, the window also having grooves in a peripheral region.

FIG. 11 shows a radiation detector comprising a crystal 180, a window 182, and a sensor 184, the window having an upper surface topography 186 designed so as to direct light towards the light sensitive regions of the sensors. Grooves such as 188 are shown provided in the lower surface of the window, but alternatively or additionally could be in either surface of the crystal or the upper surface of the window.

A series of triangular indentations 190 are provided in the upper surface of the window so as to prevent light being lost to dead spaces within or between the sensors, which would otherwise not be detected. Alternatively, structure 182 may be composed of two elements, a window proximate to the crystal and a "light pipe" interposed between the window and the light sensors. Other surface topographies can be used, as discussed further below.

Figure 12:
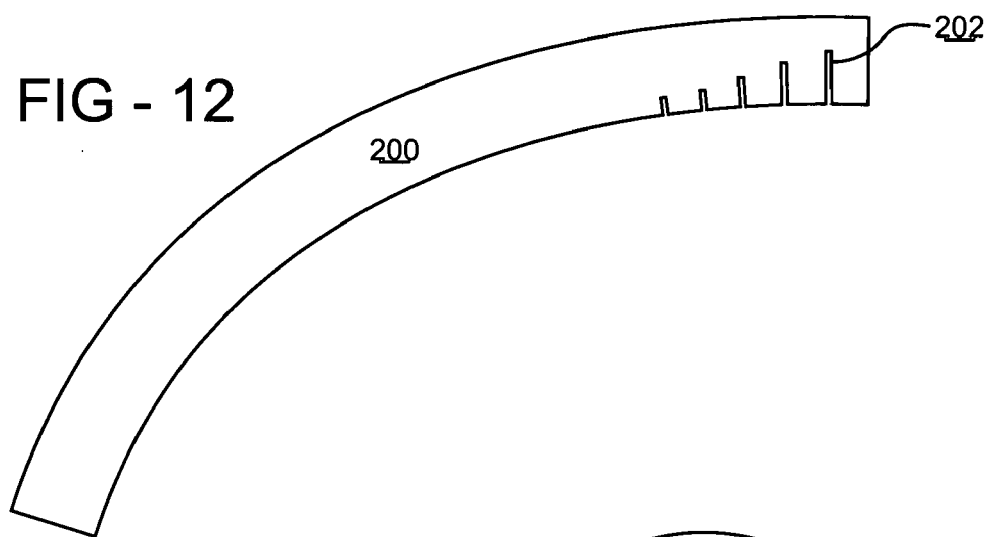
FIG. 12 shows a curved crystal having grooves in a peripheral region.

FIG. 12 shows a curved (arcuate) crystal 200 having grooves 202 within a peripheral region, proximate to one edge of the crystal. In this example the grooves are substantially radial extending from the lower surface of the crystal towards the interior.

Figure 13:
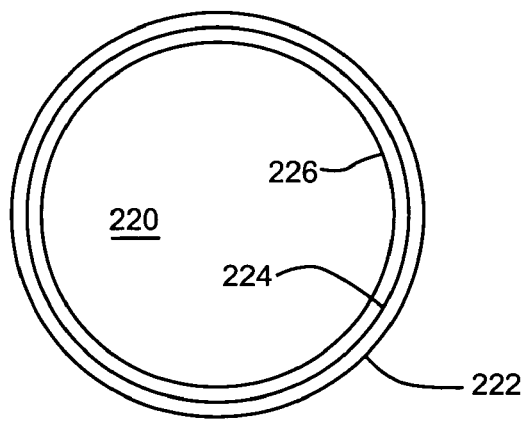
FIG. 13 shows a circular crystal having circular grooves.

FIG. 13 is a top view of a circular crystal 220, having a circular edge 222, and grooves 224 and 226 within a peripheral region proximate to the edge.

Figure 14:
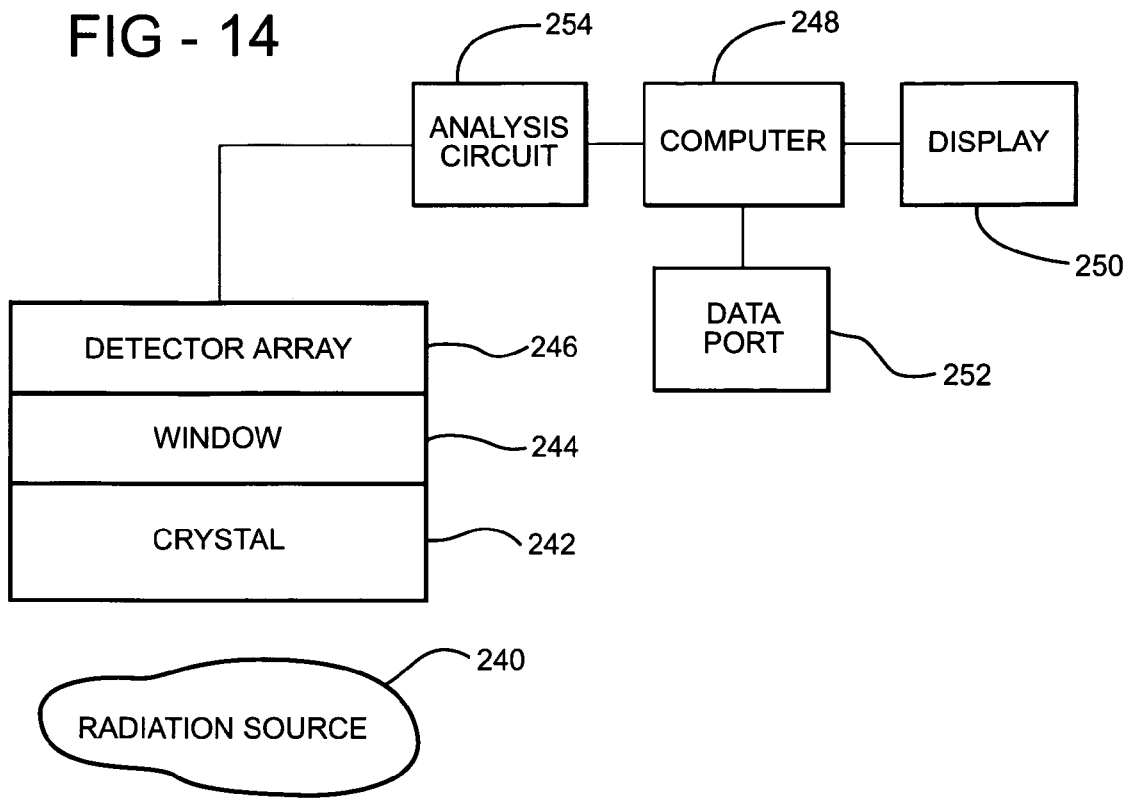
FIG. 14 shows a radiation detector configuration including a computer and display.

FIG. 14 shows a radiation detector comprising a radiation source 240, a crystal 242, a window 244, a light sensor array 246, a computer 248, a display device 250, a data port (for example, a data input device) 252, and an analysis circuit 254. A computer program running on the computer 248 can be used to extract position information provided by the light sensor array. Algorithms may be provided to provide edge corrections, depth corrections and other corrections as well known in the art. The analysis circuit may comprise noise reduction circuitry, and the like, and may be integrated with the computer into a single device. The radiation source may be a mammal under diagnosis.

Figure 15:
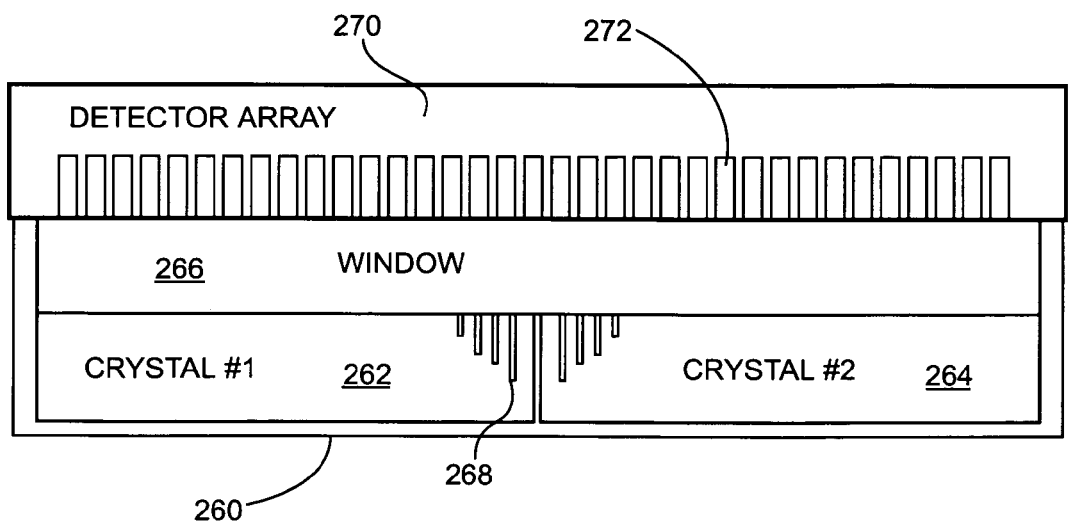
FIG. 15 shows a radiation detector having two crystals and a metal housing.

FIG. 15 shows a side view cross section of a radiation detector comprising a housing 260, a first crystal 262, a second crystal 264, substantially in abutment to the first crystal, and a window 266. The housing 260 can be a metal such as aluminum, and may provide protection of the crystal from atmospheric moisture or other sources of degradation. A detector array 270 includes a plurality of light sensors such as 272 as well as associated positioning circuitry. Grooves such as 268 are shown within peripheral regions of each crystal so as to reduce edge effects from reflections, and improve the accuracy of positional data provided by the sensor array 272 provided above the window.

In other examples, two windows can be provided in register with the crystals, and grooves provided in the windows close to the ends.

Light Guides (Grooves)

The term "light guide" can be used to refer to any structures that may be provided within a crystal to provide internal redirection of light. The light guide may be a groove (such as a cut in the surface of the crystal), and the term "groove" is used elsewhere for convenience to represent light guides. The term groove includes structures such as cuts, slots, and the like.

A light guide may include a groove, an interface between media of substantially different refractive indices, a reflective film, bubbles, defects, crystal defects such as crystal grain boundaries, fracture films, or other structure or components that provide redirection of light within the crystal before the light emerges from the light emitting surface. Light guides may also comprise embedded fibers, plastic or metal films, or other materials.

A groove can be air filled, or filled with fill material such as a liquid, plastic, glass, reflective film (such as a plastic or metal film), multilayer reflective film, fibers, spheroids (for example, forming a photonic band-gap reflector), interferometric structure, inert gas, vacuum (if the scintillator is in a sealed housing), or other material.

A light guide can be substantially parallel to a proximate edge region, and/or substantially normal to a surface in which it is formed, or nearby surface. A plurality of spaced apart light guides can be formed within a peripheral region. The depth or other extent of each light guide can be inversely correlated with the distance of the light guide from the edge (the distance being measured between the light guide and the most proximate region of the edge). The light guides may not extend entirely to any surface of the crystal or window, but may instead be disposed inside the volume of the crystal or window.

In other examples, light guides can be provided across the full extent of a surface, not just in a peripheral region. As for peripheral light guides, the depth (or analogous extent) of the light guide can be inversely correlated with the distance from the nearest edge (less when further from the edge, the relationship can be linear or nonlinear). In one example, peripheral light guides have a dept that is inversely correlated with the distance from the nearest edge, and light guides in a middle region of the surface can all have an equal depth. In another example, the light guide depths are inversely correlated with the distance from an edge, across the entire surface.

A light guide can provide partial optical confinement of scintillation light between the light guide and either another light guide or an edge. The partial optical confinement can improve the positional accuracy of a radiation detector using the scintillator.

If the scintillator has an elongated form having a uniform cross-section, having a first end and a second end, light guides can be formed in peripheral regions proximate to one or both ends.

The number of light guides proximate to an edge may be a number within the range 1–20 (inclusive), such as in the range 1–10 (inclusive), for example, one, two, three, four, five, six, seven, eight, nine, or ten. Example scintillators were made with 5–7 grooves, which were found to improve positional accuracy and dramatically reduce the edge effect dead zone near crystal edges.

Groove spacing may be regular (equal spacing), or non-equally spaced. Graduations in groove depth can be linear or non-linear with distance from the edge, or all grooves can be the same depth.

It is preferred that the light guide depth near the edges be graduated. Equal-depth grooves or light guides in a periphery region may be beneficial for some applications, but they tend to produce a zone of edge effect inside the innermost groove, i.e. the innermost groove acts like an edge. A groove extending only partway through the crystal does produce less of an edge effect than a full edge however, and is therefore somewhat useful.

The preferred embodiment, however, is the progressively graduated grooves or light guides becoming shallower as one moves inward from the edge. Since the grooves are deeper on one side of the "waveguide" than the other, they limit light spread more in one direction than the other. This produces a gradual effect rather than a sharp edge, thus eliminating all or more of the dead zone. This is due to a "one-way" diffusion aspect of the graduated depth arrangement. This can be most easily explained by reference to one of the simplest arrangements of the present invention, where grooves or light guides are provided in the light emission side of the crystal only. Light can diffuse beyond the confines of the "waveguide" at the bottom. Light that exits a waveguide at the bottom can go either toward the edge or away from the edge. Since the open path (space between bottom of light guide and bottom surface of crystal) towards the edge is smaller than the open path away from the edge, light is more likely to diffuse away from the edge. This "pushes" the emitted light away from the edge. The intensity of light reaching the light sensors, instead of being a bell shaped curve is now skewed, with a wider spread away from the edge. This "pushing" of the light emission profile away from the edge also happens for light reaching the bottom of the next waveguide further from the edge. This includes both light that traveled down that waveguide plus light that traveled to that point from the adjacent waveguides. This causes the emission profile to be skewed even further away from the edge. This skewing effect becomes less and less, however, as one looks at waveguides further and further from the edge. This is because, proportionally, the relative openings toward and away from the edge become more and more equal. For the innermost waveguide, the chance of a light photon going to the right is almost as great as its chance of going to the left. Thus, the emitted light is pushed away from the edge effect dead zone, but the degree to which it is pushed away gets less and less, the further one moves from the edge. This causes the edge effect to be blurred out and spread over a wide region.

In addition to the above, the resolution enhancing effects of the light grooves both improve resolution and mitigate the resolution reducing effects of "smearing" the edge reflections over the whole peripheral region.

The positional accuracy of an imaging device can be increased by providing more closely spaced grooves. The groove spacing may be, for example, a fraction of a sensor diameter, such as a spacing within the range 0.01–1 times the sensor diameter, such as in the range 0.05–0.5 of the sensor diameter. The groove spacing may also be a fraction of the edge thickness, such as in the range 0.01–0.5 times the edge thickness.

If the grooves have variable groove depth, such as groove depths inversely correlated with distance from the edge, in some examples the shallowest groove may be approximately 1 mm, and the deepest groove approximately equal to half the edge thickness. In some examples, the grooves may be curved.

Peripheral Region

In U.S. Pat. No. 6,563,121, Schreiner et al. describes a scintillation plate with cells formed in a regular array of like dimensions. However, away from the edges, positional data can be determined accurately from one or more sensor readings from a sensor array. In fact, the provision of grooves within the central region of a scintillator surface may degrade performance, for example through reduction in local crystal volume, and increases the cost and complexity of the scintillator.

Hence, for example, improved scintillators, light guides such as grooves are preferably provided only within a peripheral region.

The peripheral region can be defined in terms of the sensor width, for a radiation detector including a plurality of sensors. The sensor width may be for example, the outer diameter of a sensor, or the average spacing distance of sensors. The peripheral region can be defined as a region proximate to the edge of the scintillator, and not more than a distance approximately equal to the sensor width from the edge. Alternatively, the peripheral region can be defined as a region proximate to the edge of the scintillator, and not more than a distance approximately equal to the half the sensor width from the edge. If the sensor is a photomultiplier tube, the sensor width may be termed the tube width.

The peripheral region can also be defined in terms of a fraction of the overall dimensions of a surface. For example, the peripheral region of a crystal or window may be a region proximate to the edge, and not more than a certain fraction of the distance from the center to that edge. The certain fraction may be, for example, 5 percent, 10 percent, 15 percent, or 20 percent.

The peripheral region can also be defined as a region proximate to the edge, and not more than six to eight times the thickness of the slab from the edge. Alternatively, the region may be less, such as 3–4 times the thickness. The peripheral region can also be defined as a region proximate to the edge, and not more than approximately the thickness from the edge. In one example, the crystal has a thickness of ¼" to ⅜", the phototubes have a diameter of 2–"3", and the peripheral region is 1–"1.5".

In one example, a radiation detector can include a scintillator in the form of a cuboid slab having a slab length, a slab width, and a slab thickness (equal to an edge thickness), with the slab length and slab width both being substantially greater than the slab thickness. The peripheral region, for some examples, may be an outer region of the slab within approximately three to eight times or approximately equal to the edge thickness from the edge.

Manufacture of Light Guides

Light guides (such as grooves) may be formed by a variety of mechanical, chemical, optical, ultrasonic, or other means. For example, a saw can be used to cut grooves in one or more surfaces of a crystal. Grooves may also be formed by a high pressure jet of fluid. It is known that sodium iodide, a common crystal material, is soluble in water. In this case a non-aqueous fluid could be used, such as an oil, supercritical carbon dioxide, or other fluid. Water can also be used, and the surface dried quickly after jet cutting. A high pressure gas jet such as carbon dioxide or nitrogen can also be used to provide grooves in a surface.

A laser can be used to ablate or otherwise provide grooves or cuts in the surface of a crystal. For laser cutting, it is advantageous to use a different wavelength from that of the light produced by radiation within the crystal, as the crystal will presumably be substantially transparent to that wavelength; for example, x-ray, UV or IR wavelengths may be used if the scintillation light is in the visible region. The crystal may include additives so as to absorb laser radiation within a predetermined range of wavelengths to facilitate crystal processing.

Inclusions, bubbles, or defects may also be used to provide redirection of light within the crystal. For example a laser focused within the bulk of the crystal may be used to vaporize part of the crystal so as to provide an air bubble. Such defects may be provided in a regular array or pattern so as to provide the desired light guiding effect.

Bubbles may also be injected into the molten medium from which the crystal is formed. The crystal may also include other materials having a substantially different refractive index so as to provide refractive light guiding. Light guides, such as grooves, may also be formed by molding (for example of plastic or molten materials, for example during crystal growth), stamping, drilling, other mechanical processes, chemical etching, ion bombardment, electron beams, atomic beams, lithographic processes, and the like.

Crystal Geometry

A crystal may have a cuboid shape, having a light emitting face, an opposed radiation receiving face, and a rectangular edge (including first and second opposed ends, and first and second opposed sides). Any pair of opposed ends may be alternatively designated as sides, or vice versa.

The crystal has a crystal thickness, defined as the distance between the light emitting face and opposed radiation receiving face. The two faces may be parallel, providing a uniform thickness.

The light emitting face extends between the first and second ends, and between the first and second sides. Similarly, the radiation receiving face, opposed to the light emitting face, can be substantially parallel to the light emitting face and also extending between the first and second ends.

In other examples the crystal may be curved (actuate), for example either being formed initially in a curved or actuate shape, bent after crystal formation, or bent after heating or other softening process. The bending process may take place during heating of a crystal. The curve may be in a single plane, or may be in three dimensions so as to provide, for example, a spherical section.

Grooves may be formed generally normal to either the light emitting face or radiation receiving face. Grooves may be parallel to the portion of the edge to which they are proximate, for example parallel to the first or second end.

The grooves may be equally spaced, or provided at irregular intervals. The depth of the groove within the crystal, the depth being defined as the distance between the face into which the groove is cut and the distal end of the groove, can be correlated from the distance of the groove from the nearest end. For example, the correlation may be linear, exponential, quadratic, or other mathematical form.

Hence, an improved radiation detector includes a scintillator having the form of a slab, the radiation receiving face and the light emitting face being generally parallel, the slab having a slab width and a slab thickness, the slab thickness being equal to the edge thickness, the slab width being substantially greater than the edge thickness, the scintillator having a peripheral region, the peripheral region being proximate to the edge, the scintillator including one or more light guides formed only within the peripheral region. A plurality of grooves are formed in the peripheral region, the grooves acting as light guides, the depth of each groove being inversely correlated (such as inversely proportional) to a distance of the groove from the edge.

The crystal and window thicknesses can be approximately the same. The crystal and window thicknesses can be different relative thicknesses than shown in the Figures. A typical crystal (or edge) thickness may be in the range 0.125–3 inches, such as in the range 0.25 inches–0.5 inches, such as in the range of 0.25 to 0.375 inches. In some examples, the deepest groove can less than or equal to one half the edge thickness.

Some crystals, especially for PET work, may be substantially thicker, such as having a thickness greater than a width. The present invention may be used with these thicker crystals as well.

Scintillation Materials

Scintillation materials may comprise halides (such as sodium iodide, cesium iodide), oxides (such as bismuth germanate (BGO), cadmium tungstate, gadolinium orthosilicate (GSO), cerium doped yttrium orthosilicate (YSO), cerium doped lutetium orthosilicate (LSO), and the like), other inorganic materials (for example, as inorganic crystals), organic crystals, other organic materials, and other materials. Scintillation materials may include an activator and a host material, in which the activator is dispersed or otherwise disposed. The activator may be a transition metal, such as a rare earth metal. Scintillation materials can be crystalline or non-crystalline. Non-crystalline scintillation materials may comprise, for example, polymers, glasses, and other materials providing light in response to incident radiation.

In this specification, examples are provided referring to crystals, where the term crystal is used to refer to the scintillation material, such as a scintillation crystal. However, the methods and apparatus described herein can be used with any scintillation material, such as crystal or non-crystal scintillators, and also with other materials that produce light in response to non-ionizing radiation, such as fluorescent materials, or other optical elements in which edge reflections are a problem.

Windows

A window generally comprises a material substantially transparent to scintillation light. For example, a window may be bonded to, abutting, or proximate to the light output face of a crystal. The window can provide protection of the crystal from degradation, for example by protecting from scratches, moisture, fracture, and the like.

The window may be formed from any material substantially transparent to the scintillation light. Examples include glass, polymers (such as acrylic polymers, for example PMMA), transparent oxides, or other materials.

The topography of the upper surface of the window may include triangular indentations, pyramids, truncated pyramids, cones of conic sections such as frustoconical shapes, lenses, microlens arrays, Fresnel lens patterns, or other surface features operable to guide light towards light sensitive regions of the sensor. Equivalently, a window may be slab shaped, with a separate layer in optical communication with the upper surface providing light guiding. In the field of nuclear medicine, this separate layer is often referred to as the "light pipe".

The window may have a thickness in the range 0.1–0.375 inches, though this is not limiting. If the window has a surface topography within the peripheral region, for example to direct light to sensors, grooves can be formed through such features. The grooves may be normal to the average plane of the upper surface, may be parallel to a proximate edge, or otherwise provided.

Light guides (such as grooves) can be provided in the window material, so as to reduce edge effects due to reflections from the edge of the window. The grooves in the window can be in addition to, or instead of, grooves in the crystal.

Analogous geometries can be used to the crystal examples described previously, and vice versa. Grooves in the crystal can be combined with grooves in the window.

The window may overhang the crystal edges, which may reduce edge effects due to the crystal, and the addition of grooves in the window may further reduce edge effects due to reflections from the window edges.

Provision of grooves in the window can advantageously increase positional accuracy of an imaging device. The improvement may not be as great as grooves formed in a crystal. However, even if it is not possible to replace the crystal of an imaging device, the positional accuracy of the device can be improved by replacing a non-grooved window with a grooved window.

Housing

If a humidity sensitive scintillator crystal such as sodium iodide is used, a housing may be necessary to protect the crystal from the effects of atmospheric moisture. A housing may also be provided to increase robustness, hold together multiple crystals, or other purpose. The housing preferably does not substantially attenuate the incident radiation, but need not be transparent to scintillation light. Example housing materials include aluminum, other metals, plastics and the like.

Reflectors

To prevent light escaping from the radiation receiving face of the crystal, and therefore not being detected by the sensor array, reflectors may be provided. For example, a reflector may be provided by the inner reflective surface of an aluminum housing. A reflective film, such as a separate metal film or photonic band gap layer, may also be provided. For example, a reflective metal film may be evaporated onto the radiation receiving surface of a crystal. Interferometric reflectors and diffuse reflectors may also be used. Diffuse reflectors include polymer films (such as Teflon, porous Teflon, polyethylene, and the like), inorganic materials such as substantially white crystal layers, inorganic material doped polymers, and the like.

Reflectors may also be provided at the edges of the crystal and/or windows. The edge of the crystal will typically reflect scintillation light. However, additional reflector(s) can be provided.

Generally, the groove spacing will be much greater than the wavelength of scintillation light, so as not to provide a photonic band gap (PBG) effect or other interference effect. However, PBG regions or other reflective films can be provided at the edges or radiation receiving face of the crystal, if required. This can be in addition to any grooves or other light guides provided.

Absorbers may also be provided to reduce unwanted stray reflection from any surface, for example around the apertures of the sensors.

Sensors and Circuitry

Sensors which may be used include photomultiplier tubes (PMT), solid state sensors such as avalanche photodiodes, or other light sensitive devices. The sensors can be provided in a linear or two-dimensional array. Positional information of scintillation events can be determined from sensor signals.

After grooves are cut in a crystal, there may be a sensitivity reduction, due to the reduced local volume of crystal, requiring an attenuation correction. A linearity correction can also be provided to correct for any warping or spatial distortion of the image.

Amplifiers may be provided to improve the signal-to-noise ratio of the sensor array. The incident radiation may have phase information that can be used by lock-in amplifiers, an optical modulator through which scintillation light passes, or similar to reduce signal noise. Analysis circuitry can include a computer, algorithms to correct for edge effects and the like, noise reducing circuitry, and the like.

An optical coupling material, such as a liquid, gel, grease, polymer, or the like, can be provided between components so as to reduce scattering from refractive index discontinuities. For example, an optical coupling material can be provided between sensors and a window (or crystal, if no window is used) to cut down light losses.

Applications

Applications include gamma ray cameras, and other radiation detectors and imaging devices, such as nuclear medical devices. Applications include positron emission tomography (PET), single photon emission computed tomography (SPECT), combined PET/SPECT, x-ray imaging, UV imaging, cosmic ray detection, and other imaging and detection applications.

The improved radiation detection efficiency, compared with provision of uniform grooves across an entire light emitting face, is advantageous for all applications, particularly where sensitivity is an issue (such as combined PET/SPECT devices).

The methods and apparatus described herein may also be adapted to other applications, such as reducing edge effects in other materials, such as lenses, fluorescent materials, light emitting materials, light guiding materials (such as light pipes) and the like. Other examples are discussed in more detail below.

General Removal of Edge Effects from Optical Elements

Approaches described herein can be used generally to remove edge effects from optical elements. For example, a lens may be provided with one or more grooves around the periphery of one or both surfaces of the lens. Grooves (the term is used generally to refer to any light guide) may also be provided around the peripheral edges of corneal implants, spectacle lenses, and other lenses and/or lens arrays. For example, in a spectacle application, one or more grooves could be partially or completely covered by a frame element.

A lasing material may be provided with one or more grooves in the peripheral region of the light emitting face of the laser material. This may be used to reduce stray light emerging from the laser material.

Grooves may also be provided in the peripheral regions of other optical components and systems, such as along the peripheral region of waveguides, or other components of integrated optical systems. For example, they may help reduce edge effects within a waveguide.

Hence, an example improved radiation detector includes a scintillator, the scintillator having a light-emitting face, a radiation receiving face, and a periphery between the light-emitting face and the radiation receiving face, the periphery including an edge having an edge thickness. The scintillator emits scintillation light from the light emitting face in response to radiation incident on the radiation receiving face. The scintillator has a peripheral region proximate to the edge, the scintillator including one or more light guides formed only within the peripheral region. This is in contrast to other designs where light guides are formed uniformly across the surface of the scintillator. The peripheral region can be a region within approximately three to eight times the edge thickness from the edge, or within a distance approximately equal to a sensor spacing or sensor diameter if an array of sensors is used, or within half a sensor diameter (or sensor spacing). The area of the peripheral region can be less than the area of a non-peripheral region (such as a central region) not proximate to the edge. The light guide provides an internal reflection or redirection of scintillation light within the scintillator, before the scintillation emerges from the light emitting face.

If the radiation detector comprises a scintillator, a window, and an array of sensors, each sensor in optical communication with the light emitting face of the scintillator through the window, the light sensors having a light sensor diameter, the scintillator or the window can be provided with one or more grooves formed in one or both faces thereof, the one or more grooves being formed within a distance less than a light sensor diameter from an edge thereof.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims. Subheadings in the specification are provided for convenience only. Examples, alternatives, and the like should be sought within the entire specification.

Patents or publications mentioned in this specification are incorporated herein by reference to the same extent as if each individual publication was specifically and individually indicated to be incorporated by reference. In particular, U.S. Prov. Pat. App. Ser. No. 60/523,765 filed Nov. 20, 2003, is incorporated herein in its entirety. Additional information concerning imaging systems can be found in Applicant's issued patents U.S. Pat. Nos. 6,525,320, 6,525,321, and 6,504,157, and Pub. App. No. 2003/0136912, the contents of which are incorporated herein by reference.

I claim:

1. A radiation detector comprising:
a continuous body of scintillation material, the body having a light-emitting face, a radiation receiving face, and a perimeter extending between the light-emitting face and the radiation receiving face, the perimeter including an edge, the edge having an edge thickness;
the body of scintillation material emitting scintillation light from the light emitting face in response to radiation incident on the radiation receiving face;
the body of scintillation material having a peripheral region proximate to the edge;
the body or scintillation material including at least one light guide formed within the peripheral region;
the light guide operable to redirect a portion of scintillation light before the portion of scintillation light emerges from the light emitting face; and
the body of scintillation material further having a nonperipheral region in which no light guides are formed.

2. The radiation detector of claim 1, further comprising a plurality of light sensors, the sensors receiving scintillation light, the sensors each having a sensor diameter,
the peripheral region being a region within a distance approximately equal to a sensor diameter from the edge.

3. The radiation detector of claim 1, wherein the non-peripheral region is larger than the peripheral region.

4. The radiation detector of claim 1, wherein the peripheral region lies within a distance approximately equal to eight times the edge thickness from the edge.

5. The radiation detector of claim 1, wherein the peripheral region lies within a distance approximately equal to five times the edge thickness from the edge.

6. The radiation detector of claim 1, wherein the peripheral region lies within a distance approximately equal to three times the edge thickness from the edge.

7. The radiation detector or claim 1, wherein the light guide comprises a groove formed in the light emitting face or the radiation receiving face.

8. The radiation detector of claim 1, wherein the light guide comprises a reflecting film.

9. The radiation detector of claim 1, wherein the light guide comprises an interface between two regions of different refractive indices.

10. The radiation detector of claim 1, wherein the light guide provides an internal reflection of scintillation light within the body of scintillation material.

11. The radiation detector of claim 1, wherein the light guide is substantially parallel to the edge.

12. The radiation detector of claim 1, wherein the light guide extends from the light-emitting face part way to the radiation receiving face.

13. The radiation detector of claim 1, wherein the light guide extends from the radiation receiving face part way to the light-emitting face.

14. The radiation detector of claim 1, wherein the light guide has a depth, the depth being less than or equal to one half the edge thickness.

15. The radiation detector of claim 1, wherein the light-emitting face and the radiation receiving face are generally parallel.

16. The radiation detector or claim 1, wherein the scintillator is a rectangular slab having a slab length, a slab width, and a slab thickness equal to the edge thickness, the slab length and slab width both being substantially greater than the slab thickness, the peripheral region being a region within eight times the edge thickness from the edge.

17. The radiation detector of claim 1, wherein the perimeter includes a first pair of opposed edges and a second pair of opposed edges each extending between the first pair of edges, the peripheral region including regions adjacent each of the first pair of edges.

18. The radiation detector of claim 17, wherein the body or scintillation material is generally rectangular and the edges are each generally straight edges.

19. The radiation detector or claim 17, wherein the body of scintillation material is generally curved, the first pair or opposed edges being parallel generally straight edges and the second pair or opposed edges being curved edges.

20. The radiation detector of claim 1, further comprising a window disposed adjacent the light-emitting face of the body of scintillation material, the window being formed of a material substantially transparent to scintillation light, the window having at least one light guide formed therein.

21. The radiation detector of claim 20, wherein the at least one light guide in the window is aligned with the at least one light guide in the body of scintillation material.

22. The radiation detector at claim 20, wherein the at least one light guide in the window comprises a groove formed in the window.

23. The radiation detector of claim 20, further comprising an optical coupling material disposed between the body of scintillation material and the window.

24. The radiation detector of claim 1, further comprising an optical transmission element disposed adjacent the radiation receiving face of the body of scintillation material, the optical transmission clement having at least one light guide formed therein.

25. The radiation detector of claim 24, wherein the at least one light guide in the optical transmission element is aligned with the at least one light guide in the body of scintillation material.

26. The radiation detector of claim 24, wherein the at least one light guide in the optical transmission element comprises a groove formed in the optical transmission element.

27. The radiation detector of claim 1, further comprising a housing at least partially encasing the body of scintillation material.

28. The radiation detector of claim 27, wherein the housing is formed of a metal.

29. The radiation detector or claim 1, wherein the body of scintillation material is formed of a scintillation material selected from the group consisting of sodium iodide, cesium iodide, bismuth germanate (BGO), cadmium tungstate, gadolinium orthosilicate (GSO), cerium doped yttrium orthosilicate (YSO), and cerium doped lutetium orthosilicate (LSO).

30. The radiation detector of claim 1, wherein the body of scintillation material has a center, the peripheral region being defined us extending from the edge for a distance less than or equal to 20% of a distance from edge to the center of the body.

31. The radiation detector of claim 1, wherein the body of scintillation material has a center, the peripheral region being defined as extending from the edge for a distance less than or equal to 10% of a distance from edge to the center of the body.

32. The radiation detector of claim 31, wherein the light guides are generally parallel to the edge of the body.

33. The radiation detector of claim 1, wherein the body of scintillation material has a center, the peripheral region being defined as extending from the edge for a distance less than or equal to 5% of a distance from edge to the center of the body.

34. The radiation detector of claim 1, wherein the light guide is disposed generally in a plane defined perpendicular to one of the races of the body.

35. The radiation detector of claim 1, wherein the at least one light guide comprises a plurality of apart light guides formed within the peripheral region.

36. The radiation detector of claim 35, wherein the plurality of spaced apart light guides are generally parallel.

37. The radiation detector of claim 35, wherein the plurality of spaced apart light guides are generally evenly spaced.

38. The radiation detector of claim 35, wherein each of the plurality of light guides is disposed generally in a plane defined perpendicular to one of the faces of the body.

39. The radiation detector of claim 35, wherein each light guide comprises a groove formed in the light emitting race or the radiation receiving face.

40. The radiation detector of claim 35, wherein some of the plurality of light guides extend from the light-emitting face part way to the radiation receiving face.

41. The radiation detector of claim 35, wherein some of the plurality of light guides extend from the radiation receiving face part way to the light-emitting face.

42. The radiation detector according to claim 35, wherein some of the plurality of light guides extend from the light-emitting fact part way to the radiation receiving face and some of the plurality of light guides extend from the radiation receiving face part way to the light-emitting face.

43. The radiation detector of claim 35, wherein each of the light guides has a depth, the depth or each light guide being inversely correlated with the distance of the light guide from the edge.

44. The radiation detector of claim 43, wherein the deepest light guide has a depth less than or equal to one half the edge thickness.

45. The radiation detector of claim 43, wherein the shallowest light guide has a depth of approximately 1 mm.

46. The radiation detector of claim 35, wherein the non-peripheral region is larger than the peripheral region.

47. The radiation detector of claim 35, wherein the peripheral region lies within a distance approximately equal to eight times the edge thickness from the edge.

48. The radiation detector of claim 35, wherein the peripheral region lies within a distance approximately equal to three times the edge thickness from the edge.

49. The radiation detector of claim 35, wherein the body of scintillation material has a center, the peripheral region being defined as extending from the edge for a distance less than or equal to 20% or a distance from edge to the center of the body.

50. The radiation detector of claim 35, wherein the body of scintillation material has a center, the peripheral region being defined as extending from the edge for a distance less than or equal to 10% of a distance from edge to the center of the body.

51. The radiation detector of claim 35, wherein the body of scintillation material has a center, the peripheral region being defined as extending from the edge for a distance less than or equal to 5% of a distance from edge to the center of the body.

52. The radiation detector of claim 35, further comprising a window disposed adjacent the light-emitting face of the body of scintillation material, the window being formed of a material substantially transparent to scintillation light, the window having at least one light guide formed therein.

53. The radiation detector of claim 52, wherein the at least one light guide in the window is aligned with the light guides in the body of scintillation material.

54. The radiation detector of claim 52, wherein the at least one light guide in the window comprises a groove formed in the window.

55. The radiation detector or claim 35, further comprising an optical transmission clement disposed adjacent the radiation receiving face of the body of scintillation material, the optical transmission element having at least one light guide formed therein.

56. The radiation detector of claim 55, wherein the at least one light guide in the optical transmission element is aligned with the light guides in the body of scintillation material.

57. The radiation detector of claim 55, wherein the at least one light guide in the optical transmission element comprises a groove formed in the optical transmission element.

58. The radiation detector of claim 35, further comprising a housing at least partially encasing the body of scintillation material.

59. The radiation detector of claim 58, wherein the housing is formed of a metal.

60. The radiation detector of claim 35, wherein the body of scintillation material is formed of a scintillation material selected from the group consisting of sodium iodide, cesium iodide, bismuth germinate (BGO), cadmium tungstate, gadolinium orthosilicate (GSO), cerium doped yttrium orthosilicate (YSO), and cerium doped lutetium orthosilicate (LSO).

61. The radiation detector of claim 1, wherein the perimeter includes a first pair of opposed edges and a second pair of opposed edges each extending between the first pair of edges, the peripheral region including regions adjacent each of the first pair of edges, the at least one light guide comprising a plurality of light guides formed in each of the regions adjacent the first pair of edges.

62. The radiation detector of claim 61, wherein each of the light guides has a depth, the depth of the light guides being inversely correlated with the distance of the light guide from the adjacent edge.

63. The radiation detector of claim 61, wherein the body of scintillation material is generally rectangular and the edges are each generally straight edges.

64. The radiation detector of claim 61, wherein the body of scintillation material is generally curved, the first pair of opposed edges being parallel generally straight edges and the second pair of opposed edges being curved edges.

65. A scintillator comprising:
a body of scintillation material having a light-emitting face, a radiation receiving face, and a perimeter extending between the light-emitting face and the radiation receiving face, the perimeter including an edge, the edge having an edge thickness;
the body emitting scintillation light from the light emitting face in response to radiation incident on the radiation receiving face;
the body having the form of a generally continuous slab, the radiation receiving face and the light emitting face being generally parallel and coextensive,
the slab having a slab width and a slab thickness, the slab thickness being equal to the edge thickness, the slab width being substantially greater than the edge thickness;
the body having a peripheral region, the peripheral region being proximate to the edge;
the body including one or more light guides formed only within the peripheral region; and
the light guides acting so as to redirect a portion of the scintillation light before the portion of the scintillation light emerges from the light emitting race.

66. The scintillator of claim 65, the scintillation material having a non-peripheral region not proximate to the edge, the non-peripheral region encompassing the majority of the scintillator.

67. The scintillator of claim 66, wherein the scintillator has a plurality of grooves formed in the peripheral region, the grooves acting as light guides, the depth of each groove being inversely correlated to a distance of the groove from the edge.

68. The scintillator of claim 66, the one or more light guides being provided by a plurality of grooves within the peripheral region, each groove extending into the scintillator from one of the faces.

69. The scintillator of claim 68, wherein the grooves are each generally perpendicular to one of the faces.

70. The scintillator of claim 68, wherein the grooves are generally parallel to the edge and to each other.

71. The scintillator of claim 68, wherein each groove has a groove depth, the groove depth being inversely correlated with the distance of the groove from the edge.

72. The scintillator of claim 68, wherein the deepest groove is less than or equal to one half or the edge thickness.

73. The scintillator of claim 65, wherein the peripheral region lies within eight times the edge thickness from the edge.

74. The scintillator of claim 65, wherein the edge thickness is in the range of 0.25 to 0.375 inch.

75. A scintillator for use with an imaging device, the scintillator comprising:
a body having a first surface, an opposed second surface, and at least one edge extending between the first and second surfaces, an edge region being defined proximate the edge and a central region being defined in board of the edge region;

a plurality of parallel grooves defined from the first surface into the body, the grooves each having a groove depth, the grooves being disposed proximate the edge in the edge region with the groove closest to the edge having the greatest depth and subsequent grooves having lesser depths; and no grooves being defined in the central region of the body.

76. The scintillator of claim 75, wherein the groove depth decreases linearly with distance of the groove from the edge.

77. The scintillator of claim 75, wherein the groove depth decreases non-linearly with distance of the groove from the edge.

78. A radiation detector, comprising:

a scintillator producing scintillation light in response to incident radiation, the scintillator having a radiation receiving face, and a light emitting face, and a perimeter edge;

an array of sensors, each sensor in optical communication with the light emitting face of the scintillator, each light sensor having a light sensor diameter;

a window between the scintillator and the array of light sensors, the window having a first face, and a second face, and a perimeter edge;

a perimeter region being defined adjacent the perimeter edges of the scintillator and window and a central region being defined in board of the perimeter region;

the scintillator or the window having one or more grooves formed in one race thereof, the one or more grooves being formed only within a distance of less than a light sensor diameter from an edge thereof in the perimeter region and no grooves formed in central region.

79. A method of treating an optical material so as to modify the effect of internal edge reflections, the optical material having a face bounded by a perimeter, the perimeter including an edge, the method comprising:

forming a plurality of grooves in the face within a peripheral region proximate to the edge;

the face also including a non-peripheral region in which grooves are not formed, the non-peripheral region being larger in area than the peripheral region.

80. The method of claim 79, wherein the grooves are formed by cutting the optical material.

81. The method of claim 79, wherein the optical material is a scintillator.

82. The method of claim 79, wherein the optical material is used to form an optical element in an imaging device.

83. The method of claim 79, wherein the edge has a thickness and the peripheral region lies within a distance approximately equal to eight times the edge thickness from the edge.

84. The method of claim 79, wherein the edge has a thickness and the peripheral region lies within a distance approximately equal to five times the edge thickness from the edge.

85. The method of claim 79, wherein the edge has a thickness and the peripheral region lies within a distance approximately equal to three times the edge thickness from the edge.

86. The method of claim 79, wherein the grooves are substantially parallel to the edge.

87. The method of claim 79, wherein the grooves are substantially perpendicular to the face.

88. The method of claim 79, wherein the grooves each have a depth and the edge has a thickness, the depth of the grooves being less than or equal to one half the edge thickness.

89. The method of claim 79, wherein the perimeter includes a first pair of opposed edges and a second pair of opposed edges each extending between the first pair of edges, the peripheral region including regions adjacent each of the first pair of edges, the plurality of grooves comprising a plurality of grooves formed in each of the regions adjacent the first pair of edges.

90. The method of claim 89, wherein each of the grooves has a depth, the depth of the grooves being inversely correlated with the distance of the groove from the adjacent edge.

91. The method of claim 79, wherein the plurality of grooves are generally parallel.

92. The method of claim 79, wherein the plurality of grooves are generally evenly spaced.

93. A radiation detector comprising:

a scintillator having a light-emitting face, a radiation receiving face, and a perimeter extending between the light-emitting face and the radiation receiving face, the perimeter including an edge, the edge having an edge thickness;

the scintillator emitting scintillation light from the light emitting face in response to radiation incident on the radiation receiving face;

the scintillator having a peripheral region proximate to the edge;

the scintillator including a light guide formed only within the peripheral region, the light guide comprising a groove formed in the light emitting face or the radiation receiving face;

the light guide operable to redirect a portion of scintillation light before the portion of scintillation light emerges from the light emitting face;

whereby positional accuracy of the radiation detector is improved.

94. The radiation detector of claim 93, further comprising a plurality of light sensors, the sensors receiving scintillation light, the sensors each having a sensor diameter, the peripheral region being a region within a distance approximately equal to a sensor diameter from the edge.

95. The radiation detector of claim 93, the scintillator having a non-peripheral region in which no light guides are formed, the non-peripheral region being larger than the peripheral region.

96. The radiation detector of claim 93, wherein the peripheral region lies within a distance approximately equal to eight times the edge thickness from the edge.

97. The radiation detector of claim 96, wherein the peripheral region lies within a distance approximately equal to five times the edge thickness from the edge.

98. The radiation detector of claim 96, wherein the peripheral region lies within a distance approximately equal to three times the edge thickness front the edge.

99. The radiation detector of claim 93, wherein the light guide provides an internal reflection of scintillation light within the scintillator.

100. The radiation detector of claim 93, wherein the light guide is substantially parallel to the edge.

101. The radiation detector of claim 93, further comprising a plurality of spaced apart light guides, each spaced apart light guide comprising a groove formed in the light emitting face or the radiation receiving face, the plurality of spaced apart light guides being formed only within the peripheral region.

102. The radiation detector of claim 101, wherein the depth of each light guide is inversely correlated with the distance of the light guide from the edge.

103. The radiation detector of claim 93, wherein the scintillator is a rectangular slab having a slab length, a slab width, and a slab thickness equal to the edge thickness, the slab length and slab width both being substantially greater than the slab thickness, the peripheral region being a region within eight times the edge thickness from the edge.

* * * * *

UNITED STATES PATENT AND TRADEMARK OFFICE
CERTIFICATE OF CORRECTION

| | | |
|---|---|---|
| PATENT NO. | : 7,138,638 B2 | Page 1 of 1 |
| APPLICATION NO. | : 10/993012 | |
| DATED | : November 21, 2006 | |
| INVENTOR(S) | : Jack Juni | |

It is certified that error appears in the above-identified patent and that said Letters Patent is hereby corrected as shown below:

Column 16, line 35; Claim 64, Line 2 replace "races" with -- faces --

Signed and Sealed this

Twenty-second Day of July, 2008

JON W. DUDAS
*Director of the United States Patent and Trademark Office*